Sept. 21, 1965  A. SORG  3,207,643
METHOD OF MAKING WATER-PERMEABLE THERMOPLASTIC TISSUE
Filed June 1, 1964
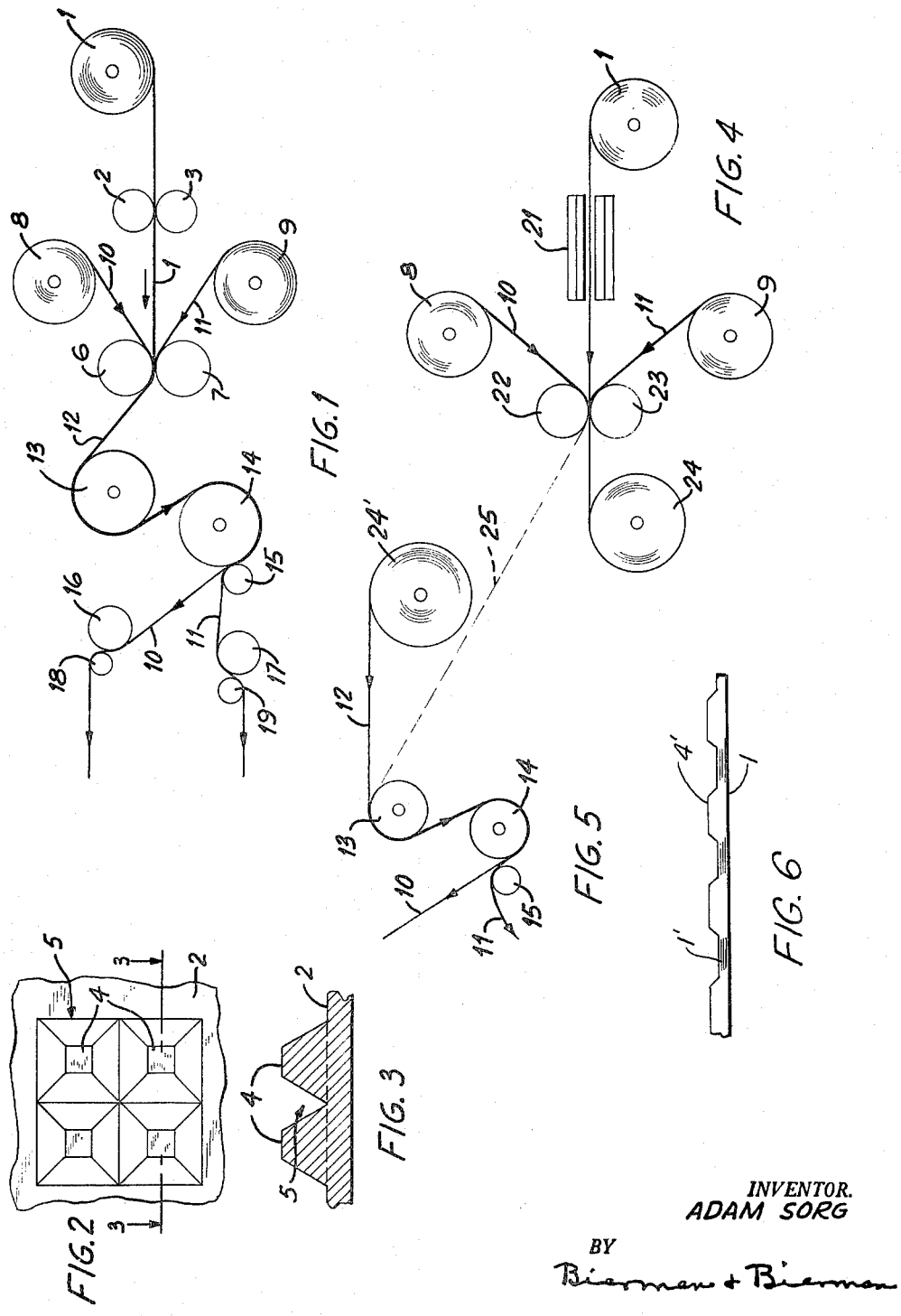
INVENTOR.
ADAM SORG
BY
Bierman & Bierman
ATTORNEYS

United States Patent Office 3,207,643
Patented Sept. 21, 1965

3,207,643
METHOD OF MAKING WATER-PERMEABLE THERMOPLASTIC TISSUE
Adam Sorg, 15 Manchester Place, Newark, N.J.
Filed June 1, 1964, Ser. No. 374,874
9 Claims. (Cl. 156—209)

The present invention is directed to the treatment of porous paper, such as filter paper for the purpose of providing heat sealing characteristics thereto without impairing the permeability thereof, and adapted for use in the manufacture of tea bags. The present application is a continuation-in-part of pending application Serial No. 39,488, filed June 29, 1960, now abandoned which is in turn a continuation-in-part of Serial No. 646,758, filed March 18, 1957 for Thermoplastic-Tissue Laminating Process and Method of Breaking the Plastic.

Amongst extensively used materials for forming infusion packages, for example, tea bags, has been a filter paper carrying a pattern that usually comprises a series of lines or dots usually equally spaced apart. The plastic usually employed has been a vinyl compound with acetone or the like, as a solvent. However, when such patterns are impressed on the filter paper, either by printing or by coating, it has been extremely difficult to drive off all of the acetone or other solvent, even when the treated filter paper is run over heater drying rollers. Any residual acetone can readily be detected by the professional tea taster, and the extra passes of the paper over drying rollers added to the cost of the resultant tea bag paper due to the extra handling, and the heating of the paper by several passes made the paper brittle and reduced its wet strength.

According to one prior method of coating porous paper, there was provided a solution of a vinyl resin which was by means of a roller applied to a web or strip of wax paper and this was subsequently contacted by a tissue or filter paper in order to form a laminated product. The latter was then passed between rolls, the wax paper removed from the filter paper and presumably some of the vinyl resin solution remained on the filter paper, which was then heated to remove the solvent. This process had very serious disadvantages in that after a short time the roller for applying the resin solution became gummy so that the deposition of the solution on the wax paper became erratic. In the laminated intermediate product, the solvent caused migration of the solution throughout the filter paper. Then in the separation of the two elements, tearing of the filter paper took place. In the subsequent heating of the filter paper there was additional migration into the interior so that heat sealing was ineffective because of the lack of sufficient resin on the surface of the paper.

In another prior art process for the production of artificial leather, a solution of a cellulose ester in a volatile solvent was coated on a fabric or the like base. The fabric itself was preheated and the resin contained plasticizers, oils and volatile solvents. It was applied in a plastic condition to the fabric and pressed into the surface thereof in order to fully impregnate the fabric. The fabric was then heated to a relatively high temperature, which caused the plastic solution to become distributed uniformly throughout the fabric and subsequently to volatilize the solvent. Such penetration into the fabric would destroy the possibility of use in making tea bags and the object of the process was to provide a non-porous and impervious surface. It was impossible to remove all of the solvent so that an undesirable taste would be imparted to tea contained in such a product. The impregnating material had toxicity which would eliminate it for use in tea bags.

The present invention is intended and adapted to overcome the difficulties and disadvantages inherent in the prior art, it being among the objects of the present invention to provide a method whereby a suitable plastic material may be deposited on the web of filter paper in spaced areas rapidly and substantially automatically while retaining a high degree of water permeability.

It is also among the objects of the present invention to provide a method wherein the plastic material used is substantially free from plasticizer and volatile solvent, whereby the product is tasteless and odorless and the wet strength of the product is high.

It is further among the objects of the present invention to so control the conditions of operation as to prevent the striking through of the plastic material and to provide an adequate amount thereof to give excellent heat sealing properties to the paper.

In the making of tea bag paper there are a number of critical factors not present in other types of plastic products. It is desirable to avoid too much penetration of the plastic into the paper as this tends to destroy the heat sealing properties. The plastic material must not be tacky or semi-solid; it must be non-toxic and have no taste or odor. Because the paper used is highly porous, it tends to draw in the plastic material due to the capillary attraction so that there is a serious tendency to cause the plastic material to spread and fill the pores of the paper.

According to the present invention, there is used a plastic material which is non-toxic, has a low melting point, is not viscous or tacky and is adapted to increase the wet strength of the paper. It has been found that polyethylene is an ideal material for this purpose. It may be applied over a relatively small proportion of the surface of the paper with but slight penetration and retaining the porosity of the paper to an extent of about 65 to 75%, or higher.

The invention is fully described below in conjunction with the accompanying drawing, in which like reference characters indicate like part, and in which:

FIG. 1 is a diagrammatic view of a system adapted for the practice of the present invention;

FIG. 2 is an enlarged fragmentary view of the face of the knurled roller which is part of said system;

FIG. 3 is a cross-sectional view taken along line 3—3 of FIG. 2;

FIG. 4 is a view similar to FIG. 1 showing a slightly modified form of the invention;

FIG. 5 is a diagrammatic view of a part of the system complementary to FIG. 4, and FIG. 6 is an enlarged fragmentary cross-sectional view of the knurled film.

In practicing the invention there is provided a film of an inert thermoplastic material of a thickness of about .0005" to .002". Said thermoplastic material should be free from odor, non-toxic, flexible, heat-sealable, having a low softening point, be capable of increasing the wet strength of paper, and be free from volatile solvents. The thickness of film is such that about 1.5 to 3 pounds are sufficient to cover a ream of the tissue used herein. Preferably, the thermoplastic which has proven best in practice is polyethylene.

Referring to FIGS. 1–3, the thermoplastic film 1 is fed by steel rolls 2 and 3. Roll 2 has knurls 4 with valleys 5 therebetween, whereby the film is knurled. The number of knurls is at least 10 per linear inch and usually about 50 per linear inch so that there are about 100 to 2500 impressions per square inch on the film. These impressions are areas of tension and strain, causing weakness, so that in the later heating rupture of the film and shrinkage of the thermosplastic film takes place. As shown in FIGS. 2 and 3, the knurling is of pyramidal units uniformly spaced, with a plurality of rows of units in parallel and a second plurality of rows in parallel, said latter rows being transverse to the first plurality of rows. As a result, after the shrinkage of the film, the thermoplastic on each tissue is in dispersed particles, there being at least 100 such particles per square inch.

It is important that roll 3 be smooth so as to avoid any embossing effect. In passing between rolls 2 and 3, the high points of the knurled roll 2, bearing against the film supported by smooth roll 3, causes those points to compress the film at 1′, leaving the intermediate areas 4′ uncompacted. Such a combination of rolls enables the use of less pressure at higher speeds with less chance of rupture of the film.

Rolls 8 and 9 carry filter or tissue paper 10 and 11, respectively, the paper having a thickness of about .009″ to .011″. They are fed to unheated rolls 6 and 7, respectively, where they cover film 1. These rolls cause the film to become laminated before the heating which follows. The laminate 12 passes over drum 13, heated in any suitable manner as by combustion gases, steam or electricity, whereby one side of the laminate becomes heated. Then it passes over drum 14 where the other side of the laminate becomes heated. The temperature used in drums 13 and 14 is about 300° to 450° F., although in most cases 350° to 400° F. is ample. After leaving drum 14 the laminate is pulled apart by a very light pull or tension of a few ounces per linear inch, and not more than one pound need be used under most conditions.

Tissue 10 passes over cooled roll 16 and guide roll 18, after which it may be formed into a roll without danger of the convolutions sticking together. Similarly, tissue 11 passes over idler roll 15, then over cooled roll 17, guide roll 19, and then to storage.

As the laminate passes over heated drums 13 and 14, the plastic film 1 softens. The compressed areas 1′ become ruptured, causing shrinkage of the film away from said areas and forming spaced spots of film on the tissues. This gives high permeability to water of the tissues, since more than half of the area is free from film, while there is sufficient plastic present to insure adhesion when the teabag is formed.

In the modification shown in FIGS. 4 and 5, the thermoplastic film 1 passes through a heating zone 21 and then between rolls 22 and 23. Preferably, roll 22 has a smooth surface and roll 23 is rubber coated and both rolls are cooled. They act to feed the thermoplastic film and the tissue. Rolls 8 and 9 carry tissue sheets 10 and 11, respectively, and the tissues are fed between rolls 22 and 23 covering film 1. The pressure of rolls 22 and 23 consolidates the tissues and film, simultaneously solidifying the thermoplastic. The temperature of the film as it enters rolls 22–23 is about 300°–450° F. Laminate 12 is fed onto storage roll 24 for later delamination. This is sometimes desirable in that the two operations may take place at different speeds and for other production reasons, so that a hiatus in the overall operation is here effected.

Laminate 12 on roll 23 is transferred to occupy the position 24′ and is passed therefrom over hot drum 13 and hot drum 14 successively to heat and soften the thermoplastic, after which tissues 10 and 11 are pulled apart, cooled and placed on rolls. In some cases it is not necessary to place the laminate in storage and it may then be continued as shown by a dotted line at 25.

In the pulling apart of the laminates obtained as shown in FIG. 1 and FIGS. 4–5, there is first a division of the thermoplastic in about equal amounts between tissues 10 and 11. Since at the moment, the thermoplastic is in flowable condition and it has separated into a large number, over one thousand, of dispersed particles on each tissue, the internal forces of surface tension tend to shrink the particles further while remaining attached to the tissues. As a result, the area covered by film is further reduced; whereas about half of the tissue area, before the shrinkage was permeable and free from film, after the shrinkage a still greater area was free, without impairment of the heat-sealable property of the tissue. In the case of the knurled film, there is a greater shrinkage than where the film is smooth, thereby affording more water-permeability.

There are several important and critical factors in addition to the knurling. It is important to heat the film before laminating, softening the film sufficiently to cause it to adhere to the tissues and to induce the shrinkage. The cooling of the laminate enables it to be stored, after which it is reheated and delaminated at the time and point of use. Also of importance is the number of particles or spots of plastic on the tissues, as this is critical to obtain the necessary balance between permeability to water and adhesion in forming teabags. The small amount of tension used in delaminating avoids the danger of tearing the delicate tissues in high speed production machinery. The number of impressions on the film, preferably over 1,000 per square inch, are translated into a similar number of particles or spots on each tissue after delaminating. Such a number has been found to insure the aforesaid balance.

I claim:
1. A continuous method of producing a water-permeable paper tissue capable of being heat sealed which comprises continuously feeding film of a thermoplastic material to a kurling zone, said film having a thickness of about .0005″ to .002″, the temperature being ambient, said thermoplastic being flexible, non-toxic, having a low softening point and being substantially free from volatile solvent, knurling one face only of the film with the other face being smooth, the knurled areas being compressed and weakened, covering both sides of said film with a porous paper tissue, the thickness of which is a maximum of about .011″, pressing said paper and film together to form a laminate, heating said laminate to a temperature of about 300° to 450° F., pulling said tissues apart while at said temperature, to cause about one-half of said thermoplastic to remain on each tissue, rupturing said compressed areas and shrinking said film so that substantially more than one-half of the area of said tissue is free from thermoplastic and is water-permeable.

2. A method according to claim 1 characterized in that said pulled-apart tissues are cooled after pulling said laminate apart.

3. A method according to claim 1 characterized in that the pulled apart tissues are cooled before being rolled up.

4. A method according to claim 1 characterized in that the thermoplastic remaining on each tissue after said pulling apart is in dispersed particles, there being at least 100 such dispersed particles per square inch.

5. A method according to claim 1 characterized in that the thermoplastic remaining on each tissue after said pulling apart is in dispersed particles, there being at least 1000 such dispersed particles per square inch.

6. A method according to claim 1 characterized in that the pull applied for separating said tissues from said laminate is less than one pound per linear inch.

7. A method according to claim 1 characterized in that the thermoplastic is polyethylene.

8. A method according to claim 1 characterized in that said knurling is of pyramidal units uniformly spaced over the area of said material.

9. A method according to claim 1 characterized in that said knurling is in a first plurality of rows in parallel, and a second plurality of rows in parallel and transverse to said first plurality of rows.

References Cited by the Examiner

UNITED STATES PATENTS

| | | | |
|---|---|---|---|
| 2,726,186 | 12/55 | Alderfer | 156—209 XR |
| 2,768,902 | 10/56 | Scholl | 156—254 |
| 2,817,618 | 12/57 | Hahn | 156—209 |
| 3,174,889 | 3/65 | Anderson et al. | 161—159 XR |

EARL M. BERGERT, *Primary Examiner.*